United States Patent [19]

Nitschke

[11] Patent Number: 4,877,437
[45] Date of Patent: Oct. 31, 1989

[54] VACUUM PLATEN FOR SHARP BENDS
[75] Inventor: David B. Nitschke, Perrysburg, Ohio
[73] Assignee: Glasstech International L.P., Scarsdale, N.Y.
[21] Appl. No.: 187,837
[22] Filed: Apr. 29, 1988
[51] Int. Cl.[4] .............................................. C03B 23/03
[52] U.S. Cl. ......................................... 65/287; 65/273
[58] Field of Search .......................... 65/106, 273, 287
[56] References Cited
U.S. PATENT DOCUMENTS
3,846,104 11/1974 Seymour ................................. 65/273
4,470,837 9/1984 Seymour ................................. 65/273
4,720,296 1/1988 Bartusel et al. ........................ 65/273

Primary Examiner—Joye Woodward
Attorney, Agent, or Firm—Brooks & Kushman

[57] ABSTRACT

Apparatus (10) for bending glass sheets (12) disclosed provides press bending between a shaping surface (16), and a press ring (26) of a complementary shape. The apparatus (10) utilizes vacuum drawn through vacuum chambers (22, 30) and thereby on the shaping surface (16), to control the bending and avoid negative curvature associated with press bending sharp bends into glass sheets (12).

8 Claims, 2 Drawing Sheets

VACUUM PLATEN FOR SHARP BENDS

TECHNICAL FIELD

This invention relates to an apparatus for press bending sharp bends in flat glass sheets.

BACKGROUND ART

Conventional press bending of a glass sheet is typically accomplished by heating the glass sheet to its bending temperature, positioning the glass sheet between a pair of cooperating press bending molds having complimentary shaping surfaces, bringing the shaping surfaces against the glass sheet and subsequently applying pressure to press bend the glass sheet so that it conforms to the shape of the shaping surfaces.

Typically one bending mold is convex and has a full surface, and the other is concave and is in the form of a ring. When the shaping surfaces have a non-abrupt curvature, the resultant bent glass sheet usually has a predictable contour and good visual properties. However, when the shaping surfaces include an abrupt curvature, the contour of the resulting bent glass sheet is not predictable and its visual properties are typically disfavorable. This unpredictable contour results because negatively curving areas are formed in the bent glass sheet. These negatively curving areas are created in the areas adjacent the abrupt curvature when the glass sheet separates from the convex surface, as the concave ring shape is pressed toward the convexly shaped surface during the bending. A fulcrum is created by the crease in the convex shaped surface and the glass is strong enough to resist bending over that crease. On either side of the fulcrum, separation of the glass sheet from the shaping surface is likely as the glass sheet is bent.

U.S. Pat. No. 4,229,200 discloses a glass bending apparatus for use in drop forming glass sheets which includes a downwardly facing vacuum through which a vacuum is applied at a pair of spaced edge chambers and an intermediate center chamber. Such a construction is stated in the patent to allow the central portion of the glass sheet to be released either before or after its edges in order to control the manner in which bending takes place.

DISCLOSURE OF INVENTION

An object of the present invention is to provide an apparatus for press bending sharp bends into glass sheets. Negative curvature and disfavorable optical qualities are avoided when the bending is performed utilizing the invention.

In carrying out the above object and other objects of the invention, the apparatus for press bending a heated glass sheet comprises a first bending mold having a shaping surface. The shaping surface includes a first portion defined by end portions and an intermediate portion extending between the end portions. The shaping surface also includes an abruptly curved a second portion having a more abrupt curvature relative to the first portion. A first vacuum chamber draws a vacuum on the first portion of the shaping surface and supports the glass sheet during bending. A second vacuum chamber is located at the second portion of the shaping surface. The second vacuum chamber draws a greater vacuum on the second portion of the shaping surface. A second bending mold has a peripheral surface of a complimentary shape to that of the shaping surface. An actuator provides relative movement between the first and second bending molds to press bend the heated glass sheet. The glass sheet is maintained in contact with the shaping surface as the glass sheet is press bent and thereby negative curvature in the bent glass sheet is avoided.

In the preferred embodiment of the invention the shaping surface is downwardly facing and also generally of a convex shape. The peripheral surface is upwardly facing and generally of a concave shape to compliment the shape of the downwardly facing convex shaping surface. Perforations are included in the shaping surface for drawing the vacuum on the shaping surface.

In the preferred embodiment of the invention the downwardly facing shaping surface includes a cloth covering to prevent the glass sheet from being marked by the shaping surface. A separate vacuum unit establishes vacuum in each vacuum chamber and a control is provided for regulating the vacuum applied to the second chamber.

The objects, features, and advantages of the present invention are readily apparent from the following detailed description of the best mode for practicing the invention when taken in connection with the accompanying drawings.

BEST MODE FOR CARRYING OUT THE INVENTION

Figure 1:
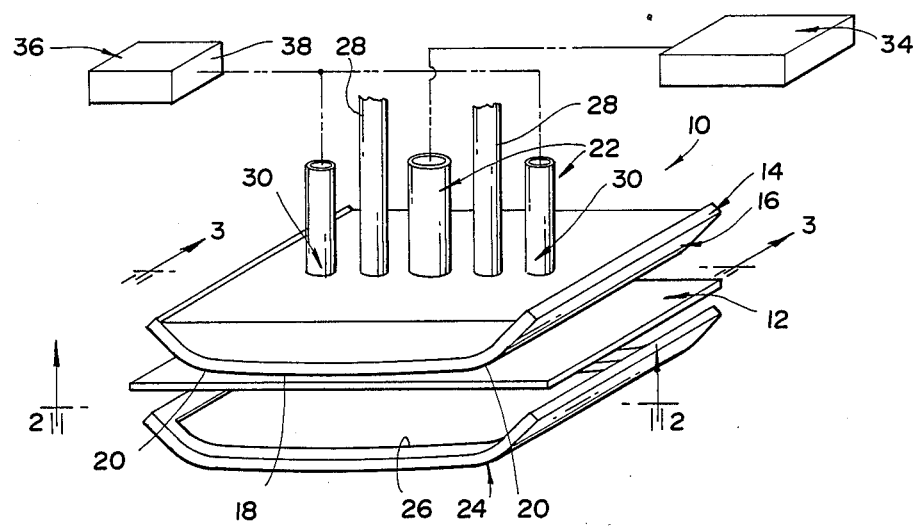
FIG. 1 is a perspective view of an apparatus for press bending a heated glass sheet in accordance with the present invention.

Referring to FIG. 1 of the drawings, an apparatus for press bending is generally indicated by reference numeral 10 and is used for press bending sharp bends into heated glass sheets here in indicated by reference numeral 12. As is more fully hereinafter described, the press bending apparatus 10 eliminates negative curvature and resultant disfavorable optical quality associated with press bending sharp bends in flat glass sheets 12.

Figure 3:
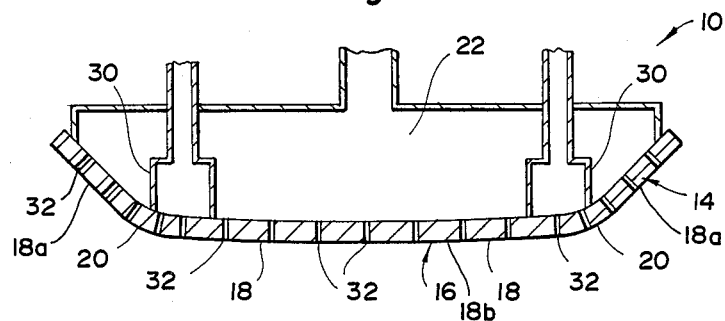
FIG. 3 is a sectional view taken along the line 3—3 in FIG. 1 illustrating the vacuum chambers in the first bending mold.

Apparatus 10 comprises a first bending mold 14 having a shaping surface 16. The shaping surface 16 includes a first portion 18 defined by end portions 18a and an intermediate portion 18b extending between the end portions. The shaping surface 16 also includes an abruptly curved second portion 20 having a more abrupt curvature relative to the first portion. A first vacuum chamber 22, best seen in FIG. 3, is used to draw a vacuum on the shaping surface 16 and support the glass sheet 12 on the first bending mold 14 during the bending. A second vacuum chamber 30, best seen in FIG. 3, is located at the second portion 20 of the shaping surface 16. The second vacuum chamber is used to draw a greater vacuum on the shaping surface 16 at the second portion 20.

With further reference to FIG. 1, a second bending mold 24, preferably a press ring, has a peripheral surface 26 of a complimentary shape to that of a shaping surface 16. An actuator 28 is operable to provide relative movement between the first and second bending molds 14,24 in a registering fashion to press bend the heated glass sheet 12 therebetween. The greater vacuum drawn in the second vacuum chamber 30 thereby maintains contact of the glass sheet 12 with the shaping surface 16 and specifically in the relatively flat area of the first portion 18 adjacent to the area of abrupt curvature 20 as the glass sheet is press bent and thereby negative curvature of the bent glass sheet in the relatively flat area is avoided.

Figure 2:
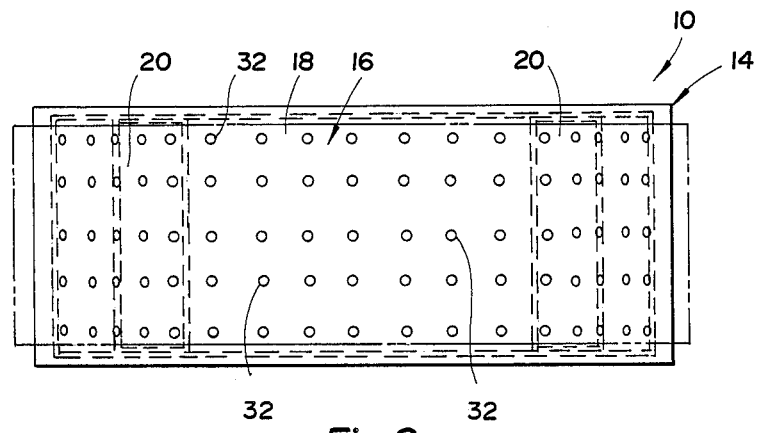
FIG. 2 is taken along line 2—2 in FIG. 1 and illustrates a shaping surface having perforations therein and also illustrates first and second vacuum chambers.

In the preferred embodiment of the invention shown in FIGS. 1, 2 and 3, the shaping surface 16 is downwardly facing and generally of a convex shape. Likewise the peripheral surface 26 is upwardly facing and generally of a concave shape to compliment the shape of the downwardly facing convex shaping surface 16. As shown in FIG. 2 the shaping surface 16 includes perforations 32 therein for drawing the vacuum on the shaping surface. The perforations 32 are preferably more concentrated in that portion of the shaping surface 16 where vacuum is drawn by the second vacuum chamber 30 and of a smaller diameter to prevent unwanted impressions on the glass sheet 12.

In the preferred embodiment of the invention, a cloth covering (not shown) covers the downwardly facing shaping surface 16 to prevent the glass sheet 12 from being marked by the shaping surface during the bending. Preferably, the covering is a fiberglass covering although other heat resistant cloth coverings may be used. In FIGS. 1 and 4 through 7, apparatus 10 is shown as including two vacuum units 34 and 36 for establishing a vacuum in the vacuum chambers 22,30.

Vacuum units 34 and 36 supply a low vacuum to chambers 22 and 30 respectively for supporting the glass sheet 12 on the shaping surface 16 while assuring that the textured pattern of the cloth is not impressed onto the glass sheet surface. A control 38 is operable for regulating the vacuum in unit 36 and chamber 30 to a high level as the glass sheet 12 is press bent for maintaining contact of the glass sheet with the shaping surface 16 at the first portion 18 adjacent the second portion 20.

OPERATION OF THE APPARATUS

FIGS. 4 through 7 are sequential illustrations of the glass sheet bending apparatus 10 showing the fundamental operation of the apparatus in a glass bending operation.

Figure 4:
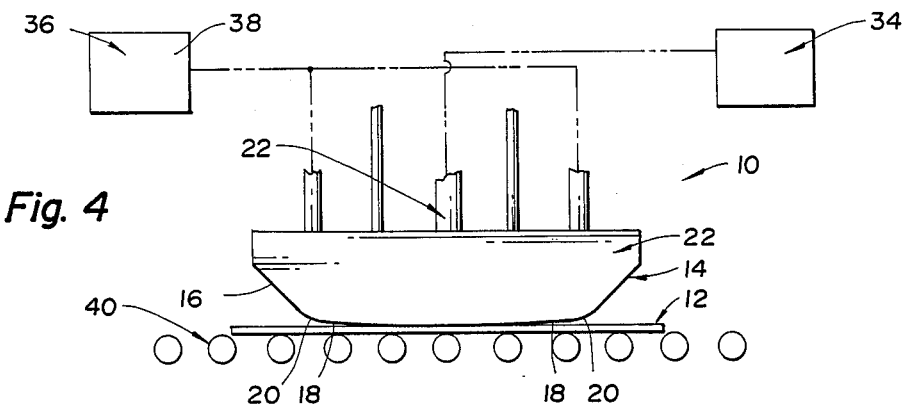
FIG. 4 is an elevational view of the first bending mold receiving a glass sheet from a roller conveyor.

FIG. 4 illustrates the glass sheet 12 having been heated to its glass bending temperature in a glass heating furnace, not shown, and subsequently positioned on a roller conveyor 40, situated beneath the shaping surface 16 of the first bending mold 14. In this position of the glass sheet 12, vacuum is supplied by vacuum units 34 and 36 to the first and second vacuum chambers 22,30 to initiate support for the glass sheet 12 on the downwardly facing shaping surface 16 of the first bending mold 14.

Figure 5:
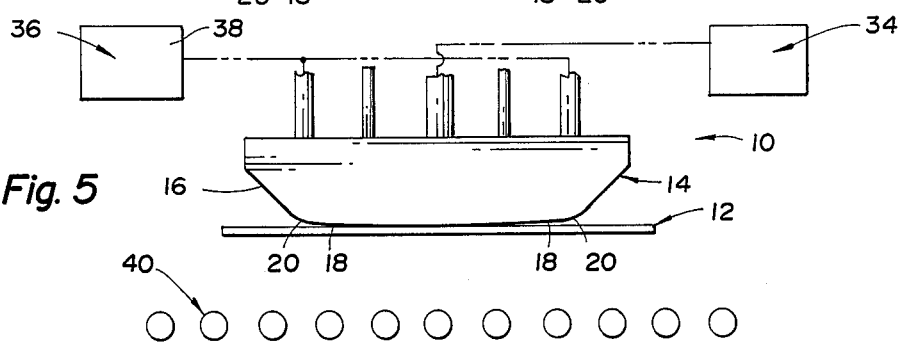
FIG. 5 is an elevational view following FIG. 4 showing the glass sheet lifted above the roller conveyor.
Figure 6:
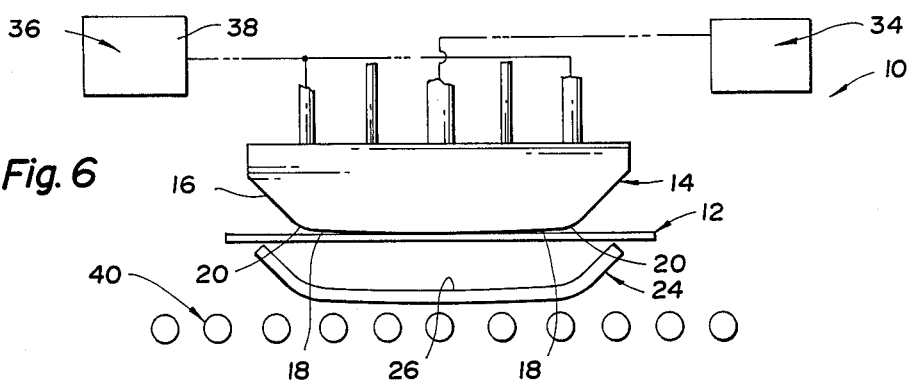
FIG. 6 is another elevational view following FIG. 5 and illustrating a second bending mold positioned beneath the first bending mold and glass sheet.

Actuator 28 is then operated to raise the first bending mold 14 with the glass sheet 12 suspended therebelow to a raised position above the roller conveyor 40 as shown in FIG. 5 so that the second bending mold 24 having the upwardly facing peripheral surface 26 can be movably positioned beneath the glass sheet and similarly the first bending mold 14, as seen in FIG. 6. In this position the glass sheet 12 is in a position to be press bent between the first and second bending molds 14,24 respectively.

Figure 7:
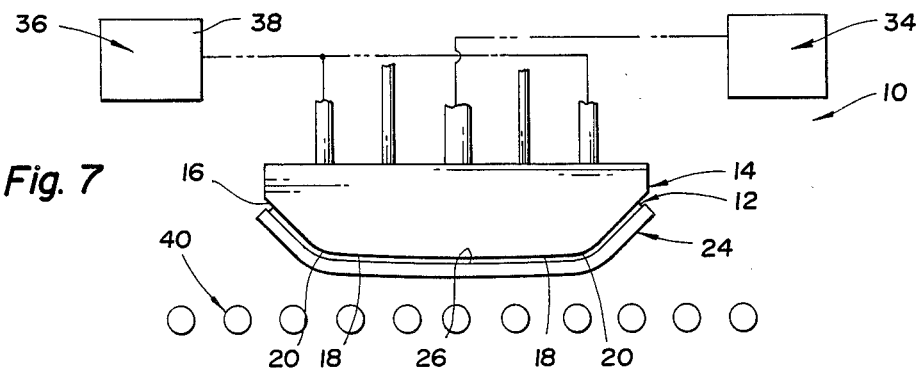
FIG. 7 is an elevational view illustrating the press bending of the glass sheet between the first and second bending molds.

Actuator 28 is then operated to provide relative movement between the first and second bending molds 14,24 to move the bending molds toward one another to press bend the heated glass sheet 12 between the shaping surface 16 of the first bending mold 14 and peripheral surface 26 of the second bending mold 24. This press bending action is shown in FIG. 7. At the same time the first and second bending molds 14,24 are moved from their respective location in FIG. 6 to the registering position shown in FIG. 7, control 38 is operated to draw a greater vacuum in the second vacuum chamber 30, shown in FIG. 3, and thereby a greater vacuum is drawn on the second portion 20 of the shaping surface 16 and also on the shaping surface 16 at the second portion 20 of the shaping surface to thereby hold the glass sheet 12 in contact with the shaping surface as the bend progresses whereby negative curvature in the glass sheet adjacent the area of abrupt curvature is avoided.

While the best mode for carrying out the invention has herein been described in detail, those familiar with the art to which this invention relates will recognize various alternative designs and embodiments for practicing the invention as defined by the following claims.

What is claimed is:

1. Apparatus (10) for press bending a heated glass sheet (12) comprising a first bending mold (14) having a shaping surface (16); said shaping surface (16) including a first portion (18) defined by end portions (18a) and an intermediate portion (18b) extending between said end portions (18a); said shaping surface (16) also including an abruptly curved second portion (20) between each of said end portions (18a) and said intermediate portion (18b); said second portion (20) having a more abrupt curvature relative to the first portion (18); a first vacuum chamber (22) for establishing a vacuum on the first portion (18) of the shaping surface (16) and supporting the glass sheet (12) thereon during bending; a second vacuum chamber (30) located at the second portion (20) of the shaping surface (16); said second vacuum chamber (30) establishing a greater vacuum on the second portion (20) of the shaping surface (16) where the curvature of the surface (16) is most abrupt; a second bending mold (24) having a peripheral surface (26) of a complementary shape to that of the shaping surface (16); and an actuator (28) for providing relative movement between the first and second bending molds (14,24) to press bend the heated glass sheet (12).

2. An apparatus (10) as in claim 1 wherein said shaping surface (16) is downwardly facing and also generally of a convex shape.

3. An apparatus (10) as in claim 2 wherein said peripheral surface (26) is upwardly facing and generally of a concave shape to complement the shape of the downwardly facing convex shaping surface (16).

4. An apparatus (10) as in claim 1 further including perforations (32) in the shaping surface (16) for drawing the vacuum thereon.

5. An apparatus (10) as in claim 4 wherein said downwardly facing shaping surface (16) includes a cloth covering to prevent the glass sheet (12) from being marked by said perforated shaping surface (16).

6. An apparatus (10) as in claim 1 further including vacuum units (34,36) for establishing respective vacuums in vacuum chambers (22,30).

7. An apparatus (10) as in claim 6 further including a control (38) connected to said second vacuum chamber (30) for regulating the vacuum in the second vacuum chamber (30).

8. Apparatus (10) for press bending a heated glass sheet (12) comprising a first bending mold (14) having a downwardly facing shaping surface (16); said shaping surface (16) including a first portion (18) defined by end portions (18a) and an intermediate portion (18b) extending between said end portions (18a); said shaping surface (16) also including an abruptly curved second portion (20) between each of said end portions (18a) and said intermediate portion (18b); said second portion (20) having a more abrupt curvature relative to the first portion (18); a first vacuum chamber (22) for establishing a vacuum on the first portion (18) of the shaping surface (16) and supporting the glass sheet (12) thereon during bending; a second vacuum chamber (30) located at the second portion (20) of the shaping surface (16); said second vacuum chamber (30) establishing a greater vacuum on the second portion (20) of the shaping surface (16) where the curvature of the surface (16) is most abrupt; a second bending mold (24) having a peripheral surface (26) of a complementary shape to that of the shaping surface (16); and an actuator (28) for providing relative movement between the first and second bending molds (14,24) to press bend the heated glass sheet (12).

* * * * *